United States Patent
Freeman

(10) Patent No.: US 10,794,369 B1
(45) Date of Patent: Oct. 6, 2020

(54) SOLAR POWERED CLOSED LOOP SYSTEM AND METHOD FOR POWERING A COOLING DEVICE

(71) Applicant: Walter B. Freeman, Cave Junction, OR (US)

(72) Inventor: Walter B. Freeman, Cave Junction, OR (US)

( * ) Notice: Subject to any disclaimer, the term of this patent is extended or adjusted under 35 U.S.C. 154(b) by 0 days.

(21) Appl. No.: 16/351,418

(22) Filed: Mar. 12, 2019

Related U.S. Application Data

(60) Provisional application No. 62/721,106, filed on Aug. 22, 2018.

(51) Int. Cl.
*F03G 6/00* (2006.01)
*F25B 27/00* (2006.01)

(52) U.S. Cl.
CPC .............. *F03G 6/00* (2013.01); *F25B 27/005* (2013.01)

(58) Field of Classification Search
CPC .. F03G 6/00; F01K 25/08; F25B 13/00; F25B 27/00; F25B 11/00; F04B 9/113; F04B 43/1136; F04B 43/1133; F04B 43/113; F04B 9/125; F04B 9/1253; F04B 9/1256
See application file for complete search history.

(56) References Cited

U.S. PATENT DOCUMENTS

| | | | |
|---|---|---|---|
| 4,178,989 A | 12/1979 | Takahashi et al. | |
| 4,273,184 A * | 6/1981 | Tanaka | F24D 11/0221 62/235.1 |
| 7,146,794 B2 | 12/2006 | Hatamiya et al. | |
| 9,359,953 B2 * | 6/2016 | Yoshida | F01K 23/10 |
| 9,458,837 B2 * | 10/2016 | Brodetsky | F01K 21/04 |
| 2004/0244376 A1 * | 12/2004 | Litwin | F03G 6/064 60/641.8 |
| 2009/0266096 A1 * | 10/2009 | Minds | F01K 13/00 62/235.1 |
| 2012/0023941 A1 * | 2/2012 | Holec | F03G 6/00 60/641.8 |
| 2014/0060050 A1 * | 3/2014 | Kosamana | F03G 6/067 60/651 |
| 2016/0195313 A1 | 7/2016 | Finkleman | |

* cited by examiner

*Primary Examiner* — Shafiq Mian
(74) *Attorney, Agent, or Firm* — Jerry Haynes Law

(57) ABSTRACT

A solar powered closed loop system and method for powering a cooling unit. The system and method provide a fully closed system that harnesses the power of the sun with a solar energy collecting device to generate vapor. The vapor has characteristics of high energy, expansion, and compressibility that enable travel through a plurality of conduits in the closed loop. The system generates vapor, carries the vapor and resultant gas, expands energy, and produces condensate through use of: a vapor expander, a compressor, a gas-liquid heat exchanger, an accumulator, an air-to-air heat exchanger, and a vapor condenser. Thus, through expansion, compression, and conversion different states of the vapor are controllably generated and disbursed for work. The work generated from the expansion and energy release from the vapors and gases produces work for powering the air-to-air heat exchanger, such as a cooling unit, and driving a load.

10 Claims, 3 Drawing Sheets

SOLAR POWERED CLOSED LOOP SYSTEM AND METHOD FOR POWERING A COOLING DEVICE

CROSS-REFERENCE TO RELATED APPLICATIONS

This application claims the benefits of U.S. provisional application No. 62/721,106, filed Aug. 22, 2018 and entitled SOLAR POWERED AIR COOLING, which provisional application is incorporated by reference herein in its entirety.

FIELD OF THE INVENTION

The present invention relates generally to a solar powered closed loop system and method for powering a cooling unit. More so, the present invention provides a fully closed system that harnesses the power of the sun with a solar energy collecting device to generate vapor; whereby the vapor has characteristics of high energy, expansion, and compressibility that enable travel through a plurality of conduits in the closed loop; and further use of: a vapor expander, a compressor, a gas-liquid heat exchanger, an accumulator, an air-to-air heat exchanger, and a vapor condenser; whereby, through expansion, compression, and conversion different states of the vapor are controllably generated; and the work generated from the expansion and energy release from the vapors and gases produces work for powering the air-to-air heat exchanger, such as a cooling unit, and driving a load.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Typically, solar energy is radiant light and heat from the Sun that is harnessed using a range of ever-evolving technologies such as solar heating, photovoltaics, solar thermal energy, solar architecture, molten salt power plants and artificial photosynthesis.

Generally, steam power efficiency has historically been limited by the loss of latent heat of vaporization, which amounts to 966 BTU per pound of water converted into vapor. Molecules in liquid water are held together by relatively strong hydrogen bonds, and its enthalpy of vaporization, 40.65 kJ/mole, is more than five times the energy required to heat the same quantity of water from 0° C. to 100° C. Thus, the loss of heat from water when high temperatures and pressures are applied, is significant. The present invention reduces that loss by utilizing a significant portion of the latent heat of vaporization to produce power.

Other proposals have involved collecting solar power to energize a cooling unit, such as an air conditioner or HVAC. The problem with these cooling unit powering systems do not provide multiple components that work together to expand, compress, redirect, and harness the vapor power. Even though the above cited solar energy powered cooling unit systems meet some of the needs of the market, a fully closed system that harnesses the power of the sun with a solar energy collecting device to generate vapor; whereby the vapor has characteristics of high energy, expansion, and compressibility that enable travel through a plurality of conduits in the closed loop; and further use of: a vapor expander, a compressor, a gas-liquid heat exchanger, an accumulator, an air-to-air heat exchanger, and a vapor condenser; whereby, through expansion, compression, and conversion different states of the vapor are controllably generated; and the work generated from the expansion and energy release from the vapors and gases produces work for powering the air-to-air heat exchanger, such as a cooling unit, and driving a load, is still desired.

SUMMARY

Illustrative embodiments of the disclosure are generally directed to a solar powered closed loop system and method for powering a cooling unit. The system and method provide a fully closed system that harnesses the power of the sun with a solar energy collecting device to generate vapor. The vapor has characteristics of high energy, expansion, and compressibility that enable travel through a plurality of conduits in the closed loop. The system generates vapor, carries the vapor and resultant gas, expands energy, and produces condensate through use of: a vapor expander, a compressor, a gas-liquid heat exchanger, an accumulator, an air-to-air heat exchanger, and a vapor condenser. Thus, through expansion, compression, and conversion different states of the vapor are controllably generated and disbursed for work. The work generated from the expansion and energy release from the vapors and gases produces work for powering the air-to-air heat exchanger, such as a cooling unit, and driving a load.

In some embodiments, the system and method may provide a solar energy collecting device that heats water to the state of vapor. The solar energy collecting device serves as source for creation of hot water, vapor, and steam in a thermodynamic condition so as to become steam in part or in total, through efficient harnessing of the sun light. Vapor is carried through a solar collector conduit to a primary vapor expander. The primary vapor expander recovers the expansion work of the vapor, generating energy and excess exhaust.

The primary vapor expander is operatively connected to a primary load. The primary load may include, without limitation, an electrical generation system, a pump, and a direct-connected mechanical device. The generated energy from the primary vapor expander urges articulation of mechanical components in the primary load, which in turn, may generate electricity.

In addition to energy, the primary vapor expander also emits exhaust. The exhaust from the primary vapor expander flows through a vapor expander exhaust conduit to a vapor condenser, or a cooled gas re-heater. The vapor condenser causes the exhaust to form a condensate.

Additionally, the energy generated by the primary vapor expander is harnessed to power a compressor. The compressor is configured to compress a gas, i.e., air. The compression of the gas raises the temperature of the gas by a factor directly proportional to the compression ratio of the compressor. This results in a controlled generation of a compressed and heated gas.

The compressed and heated gas travels through a heated gas transfer conduit to a gas-liquid heat exchanger. While passing through the length of the gas-liquid heat exchanger, the compressed and heated gas releases heat and consequently cools to a cooled gas. The released heat works to heat the condensate from the vapor condenser. Consequently, the condensate is heated and returned to the solar energy collecting device to the primary expander intake or to a hot liquid storage system, for reconstitution to a vapor state, through a heated condensate return conduit.

At least a portion of the cooled gas that has passed through the gas-liquid heat exchanger is carried to a receiver accumulator through a cooled gas transfer conduit. The gas is then stored and may be used for multiple functions, including for use in the compressor.

Another portion of the cooled gas is carried to an air-to-air heat exchanger, or cooling unit, i.e., air conditioner through the cooled gas transfer conduit. Here, the cooled air expands, cooling to a greater extent. An ambient air inlet introduces warmer, ambient air into the air-to-air heat exchanger.

Heat is consequently transferred from the introduced ambient air to the expanding air introduced into the air-to-air heat exchanger. This causes the ambient air to cool significantly, while leaving the air-to-air heat exchanger through a cooled air outlet.

Thus, the initial energy supplied by the solar energy collecting device efficiently allows for operation of the cooling unit. After receiving the heat from the ambient air, the re-heated gas is carried through a re-heated air conduit, to a gas expander. The re-heated air expands in the gas expander, which serves to produce work that drives a connected gas expander load.

The generated work from the gas expander urges articulation of mechanical components in a gas expander load, which in turn, generates electricity. Subsequently, a gas expander exhaust conduit carries at least a portion of the re-heated gas from the gas expander to the compressor for further compression and heating of the gas.

One objective of the present invention is to harness the power of the sun to generate vapors, and then carry and change the state of the vapors to generate work, energy, and driving forces for a cooling unit and a load.

Another objective is to provide an advantageous method for harnessing the heat of generated vapor without experiencing the disadvantages met with the existing techniques.

Another objective is to provide a closed loop system that efficiently harnesses solar energy to power a cooling unit.

Yet another objective is to heat, cool, and compress the vapor and its varying forms to produce work for driving a load.

Yet another objective is to provide heat exchangers to convert the energy from expansion of gases to produce work for powering a cooling unit and driving a load.

Yet another objective is to efficiently carry the vapor, condensate, and the compressed and heated gas through a series of strategically placed conduits for heating and cooling through a solar energy collecting device, a vapor expander, a compressor, a gas-liquid heat exchanger, an air-to-air heat exchanger, an accumulator, and a vapor condenser for expansion, compression, and conversion between states of the vapor to change the state of gas and water, such that latent energy is created and harnessed to drive a load.

Yet another objective is to create an efficient solar energy power harnessing system and method, operable for various manufacturing, utility, and agricultural uses.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1:
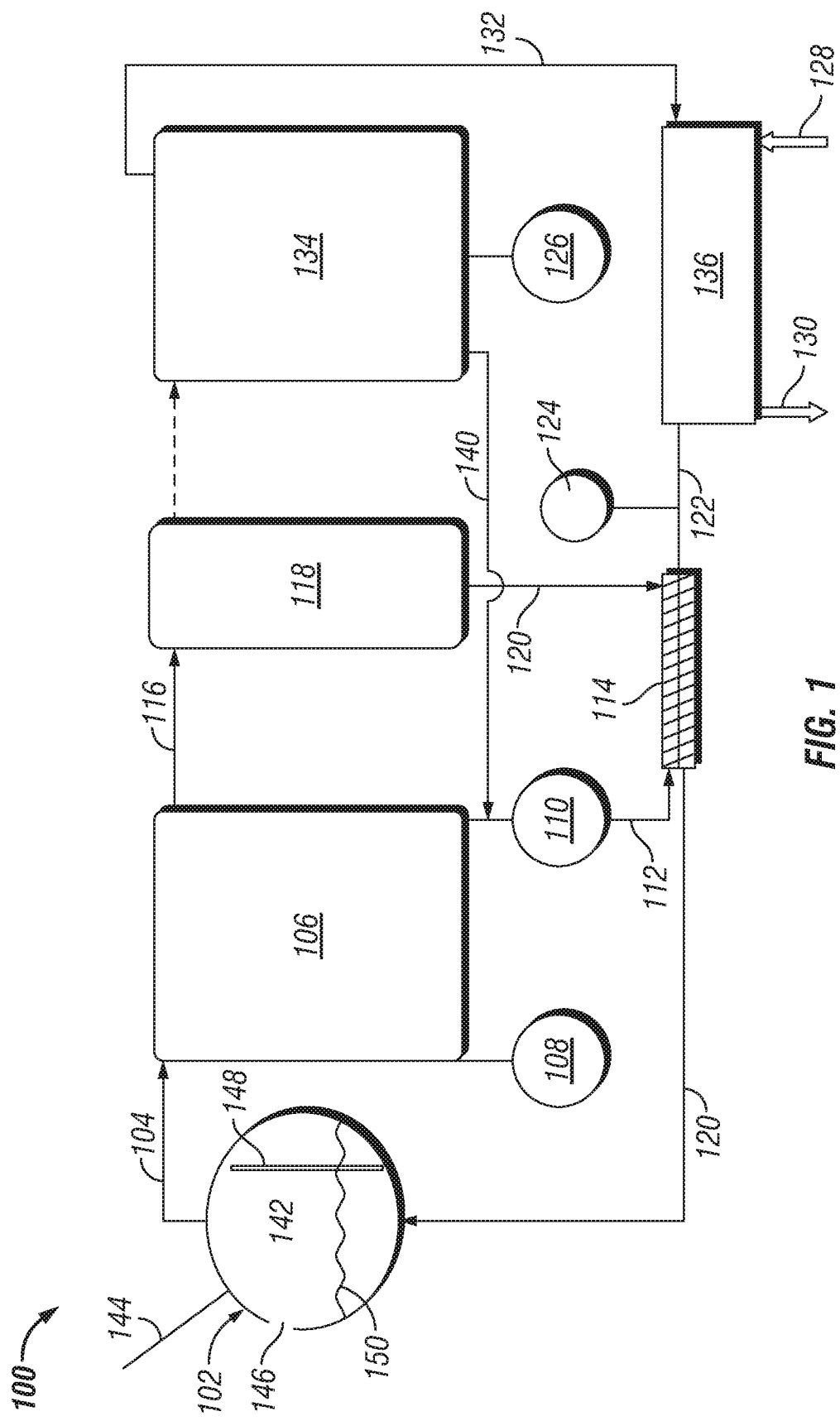
FIG. 1 illustrates a block diagram of an exemplary a method for harnessing latent heat to generate energy, in accordance with an embodiment of the present invention.
Figure 2A:
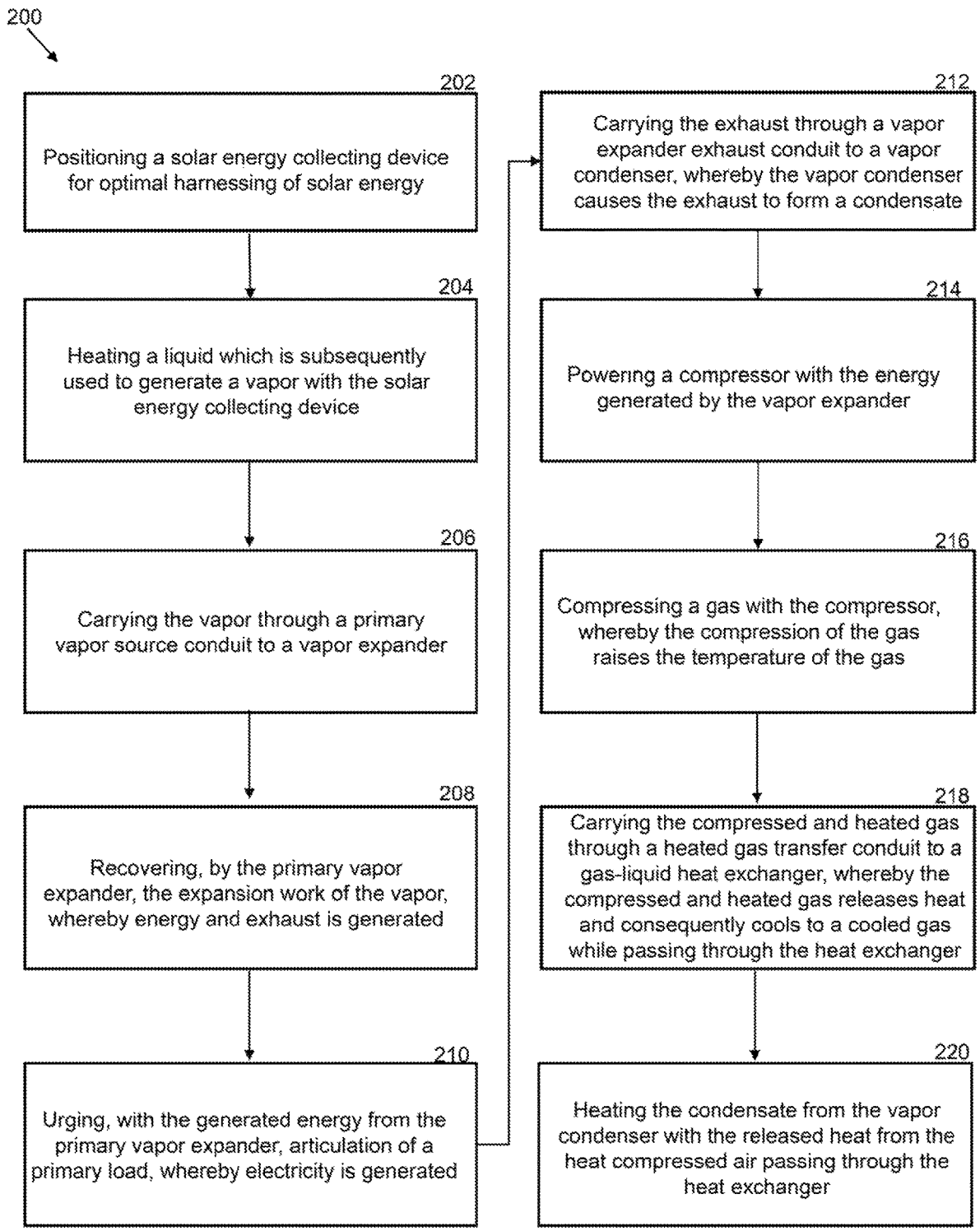
FIGS. 2A and 2B illustrate flowcharts for a method for harnessing latent heat to generate energy, in accordance with an embodiment of the present invention.
Figure 2B:
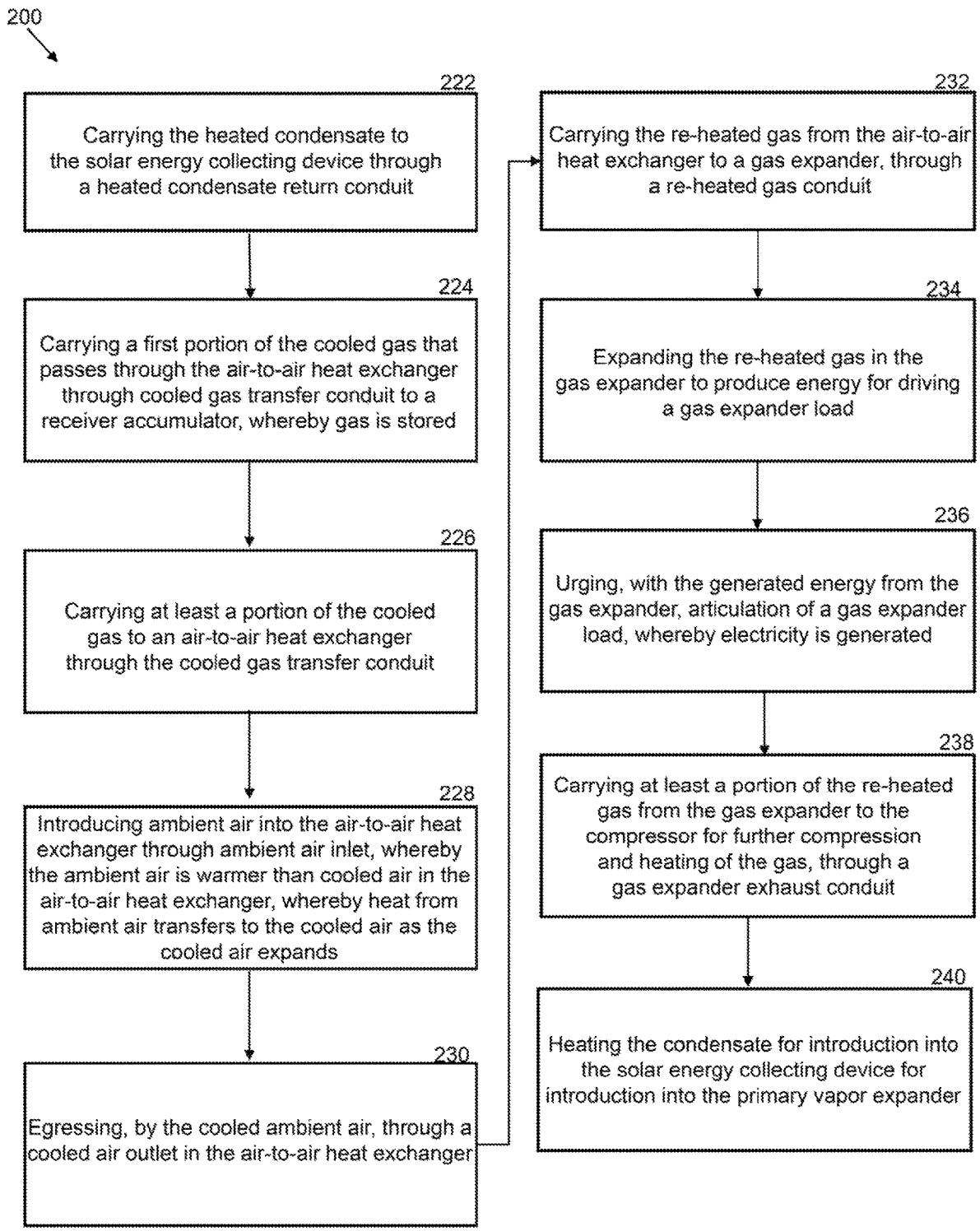

A solar powered closed loop system 100 and method 200 for powering a cooling unit is referenced in FIGS. 1-2B. The solar powered closed loop system 100 for powering a cooling unit, hereafter "system 100" is unique in forming a closed loop arrangement of components that receive initial powering from a renewable power source, such as a solar energy collecting device or a solar panel, or a solar thermal collector, so as to generate vapor, steam, or high energy states of liquids. The system 100, thus, harnesses the power of the sun to generate vapors or liquid in such a thermal condition as to become vapor, and then carries and changes the state of the derivative vapors to generate work, energy, and driving forces for a cooling unit and a load.

Specifically, the sun's light is harnessed with a solar energy collecting device 102, which is optimally positioned to efficiently capture solar energy for heating a condensate to a gas, or vapor phase. It is this vapor, with the energy of expanding gases that substantially drives an air-to-air heat exchange—or cooling unit. After the vapor is generated from the heating effect of solar energy, a plurality of conduits carry the vapor and resultant gas, expanded energy, and condensate to various components, including: a primary vapor expander 106, a compressor 110, a gas-liquid heat exchanger 114, an air-to-air heat exchanger 126, an accumulator 124, and a vapor condenser 118.

Thus, through expansion, compression, and conversion different states of the vapor are controllably generated and disbursed for work. The work generated from the expansion and energy release from the vapors and gases produces work for powering the air-to-air heat exchanger, such as a cooling unit, and driving a load. A return conduit carries condensate back to the solar energy collecting device for reheating and subsequent vaporization; creating a closed loop; and perpetual repetition of the cycle. This solar energy-centered system produces work for driving a load that powers an air-to-air heat exchanger, the air cooling unit, and other mechanisms receiving power from the loads.

As referenced in FIG. 1, the system 100 provides a solar energy collecting device 102 that heats water to be converted to, or be stored for, subsequent conversion to vapor. The solar energy collecting device 102 serves as an engine to generate vapor, steam, and high pressure gases though efficient harnessing of sun light. The solar energy collecting device 102 may include, without limitation, a solar panel, a solar cell arrangement, a solar thermal collector, a heated liquid storage system, a geothermal source of steam or hot water, photovoltaics, solar thermal energy, solar architecture, molten salt power plants and artificial photosynthesis. In one alternative embodiment, a boiler or heat exchanger may be used in place of the solar energy collecting device 102 however. In one embodiment, the solar energy collecting device 102 serves as the "vapor source" of the invention, and may include a flash evaporator where vapor is generated by using heat stored in a liquid to evaporate all or part of the liquid.

In one non-limiting embodiment, the solar energy collecting device 102 comprises an enclosed housing 142 containing an amount of water 150 to be boiled, the housing comprising one or more thermally conductive sidewalls which form a substantially enclosed water chamber and a reflection chamber 144. The reflection chamber 144 may include a closed top portion and an opening through which light rays from the Sun pass through. Continuing, the opening 146 in the housing 142 is vertically disposed below the top portion of the chamber so that the reflection chamber 144 may trap heat. The housing 142 may also include at least one of the thermally conductive sidewall 148 disposed to divide the water chamber from the reflection chamber 144.

The vapor or heated liquid from the solar energy collecting device 102 is carried through a solar collector conduit 104 to a primary vapor expander 106. The primary vapor expander 106 recovers the expansion work of the vapor, generating energy and excess exhaust. The primary vapor expander 106 is operatively connected to a primary load 108. The primary load may include, without limitation, an electrical generation system 100, a pump, and a direct-connected mechanical device.

The generated energy from the primary vapor expander 106 urges articulation of mechanical components in the primary load 108, which in turn, generates electricity. In addition to energy, the primary vapor expander 106 also emits exhaust. The exhaust from the primary vapor expander 106 flows through a vapor expander exhaust conduit 116 to a vapor condenser 118, or a cooled gas re-heater. The vapor condenser 118 causes the exhaust to form a condensate.

Additionally, the energy generated by the primary vapor expander 106 is harnessed to power a compressor 110. The compressor 110 is configured to compress a gas, i.e., air. The compression of the gas raises the temperature of the gas by a factor directly proportional to the compression ratio of the compressor. This results in a controlled generation of a compressed and heated gas.

The compressed and heated gas travels through a heated gas transfer conduit 112 to a gas-liquid heat exchanger 114. While passing through the length of the gas-liquid heat exchanger 114, the compressed and heated gas releases heat and consequently cools to a cooled gas. The released heat works to heat the condensate from the vapor condenser 118. Consequently, the condensate is heated and returned to the system for subsequent reconstitution to a vapor state, through a heated condensate return conduit 120.

At least a portion of the cooled gas that has passed through the gas-liquid heat exchanger 114 is carried to a receiver accumulator 124 through a cooled gas transfer conduit 122. The gas is then stored and may be used for multiple functions, including for use in the compressor.

Another portion of the cooled gas is carried to an air-to-air heat exchanger 126, or cooling unit, i.e., air conditioner through the cooled gas transfer conduit 122. Here, the cooled air expands, cooling to a greater extent. An ambient air inlet 128 introduces warmer, ambient air into the air-to-air heat exchanger 126.

Heat is consequently transferred from the introduced ambient air to the expanding air introduced into the air-to-air heat exchanger 126. This causes the ambient air to cool significantly, while leaving the air-to-air heat exchanger 126 through a cooled air outlet 130. Thus, the initial energy supplied by the solar energy collecting device 102 efficiently allows for operation of the cooling unit.

Those skilled in the art will recognize that the cooling unit may include an absorption cooling system or a thermoelectric cooling system. The cooling unit may also include a solar collector matched with an air venting system. The cooling unit may hang on the inside of a window or on another vertical surface and utilize the heat and/or radiation from the sun to activate a cooling mechanism that, in turn, provides cooling. In other embodiments, the cooling unit is an air conditioner with a blower and cooling coil. Though other cooling means, consistent with a heat exchange process may also be used.

After receiving the heat from the ambient air, the re-heated gas is carried through a re-heated air conduit 132, to a gas expander 134. The gas expander 134 may include, without limitation, a motor, a turbine, or a device similar in design to that of the thermal energy recovery system 100 previously referenced.

The re-heated air expands in the gas expander 134, which serves to produce work that drives a connected gas expander load 136 that is an electrical component of gas expander 134. In some embodiments, the gas expander 134 may include, without limitation, a motor, a turbine, and a device similar in design to that of the thermal energy recovery previously referenced.

The generated work from the gas expander 134 urges articulation of mechanical components in a gas expander load 138, which in turn, generates electricity. Subsequently, a gas expander exhaust conduit 140 carries at least a portion of the re-heated gas from the gas expander to the compressor for further compression and heating of the gas.

FIGS. 2A and 2B illustrate flowcharts for a method 200 for harnessing latent heat to generate energy. The method 200 provides a fully closed latent heat recovery system 100 that utilizes a solar energy collecting device to generate vapor. Or alternatively, heat a liquid to such a thermodynamic state as to become in part or in total a vapor. A plurality of conduits carries the vapor and resultant gas, expanded energy, and condensate to: a vapor expander, a compressor, a heat exchanger, an accumulator, and a vapor condenser for expansion, compression, and conversion between states of the vapor. The latent heat generated from the expansion and energy release from the vapors and gases produces work for driving a load.

The method 200 may include an initial Step 202 of positioning a solar energy collecting device for optimal harnessing of solar energy. Those skilled in the art will recognize that solar energy is radiant light and heat from the Sun that is harnessed using a range of ever-evolving technologies such as solar heating, photovoltaics, solar thermal energy, solar architecture, molten salt power plants and artificial photosynthesis. The present invention attempts to orient the solar energy collecting device 102 for optimal collection of sun light for heating, and consequently vaporing a liquid, which may include, but is not limited to, water.

A Step 204 comprises generating vapor or a liquid with the solar energy collecting device. The solar energy collecting device may include, without limitation, a boiler, a heat exchanger, a solar thermal collector, or a geothermal source of steam or hot water. The method 200 may further comprise a Step 206 of carrying the vapor through a solar collector conduit to a primary vapor expander. A Step 208 includes recovering, by the primary vapor expander, the expansion work of the vapor, whereby energy and exhaust is generated.

In some embodiments, a Step 210 comprises urging, with the generated energy from the primary vapor expander, articulation of a primary load, whereby electricity is generated. A Step 212 includes carrying the exhaust through a vapor expander exhaust conduit to a vapor condenser, whereby the vapor condenser causes the exhaust to form a condensate. In some embodiments, a Step 214 may include powering a compressor with the energy generated by the primary vapor expander. A Step 216 comprises compressing a gas with the compressor, whereby the compression of the gas raises the temperature of the gas by a factor directly proportional to the compression ratio of the compressor.

The method 200 may further comprise a Step 218 of carrying the compressed and heated gas through a heated gas transfer conduit to a gas-liquid heat exchanger, whereby the compressed and heated gas releases heat and consequently cools to a cooled gas while passing through the gas-liquid heat exchanger. The method 200 may further comprise a Step 220 of heating the condensate from the vapor condenser with the released heat from the heat exchanger, the condensate is heated. A Step 222 includes carrying the heated condensate to the solar energy collecting device through the vapor expander, or intake a heated condensate return conduit, whereby the condensate is recycled to the vapor state, or a heated liquid storage system In some embodiments, a Step 224 comprises carrying a first portion of the cooled gas that has passed through the heat exchanger through a cooled gas transfer conduit to a receiver accumulator, whereby the gas is stored. A Step 226 includes carrying at least a portion of the cooled gas to an air-to-air heat exchanger 126 through the cooled gas transfer conduit 122. A Step 228 comprises introducing ambient air into the air-to-air heat exchanger through an ambient air inlet, whereby the ambient air is warmer than the cooled air in the air-to-air heat exchanger, whereby heat from the ambient air transfers to the cooled air. A Step 230 may include egressing, by the cooled ambient air, through a cooled air outlet in the air-to-air heat exchanger.

Another portion of the cooled gas is carried to an air-to-air heat exchanger 126, or cooling unit, i.e., air conditioner through the cooled gas transfer conduit 122. Here, the cooled air expands, cooling to a greater extent. An ambient air inlet 128 introduces warmer, ambient air into the air-to-air heat exchanger 126. Heat is consequently transferred from the introduced ambient air to the expanding air introduced into the air-to-air heat exchanger 126. This causes the ambient air to cool significantly, while leaving the air-to-air heat exchanger 126 through a cooled air outlet 130.

The method 200 may further comprise a Step 232 of carrying the re-heated gas from the air-to-air heat exchanger to a gas expander, through a re-heated gas conduit. The gas expander 126 may include, without limitation, a motor, a turbine, and a device similar in design to that of the thermal energy recovery previously referenced. A Step 234 comprises expanding the re-heated gas in the gas expander to produce energy for driving a gas expander load.

A Step 236 includes urging, with the generated energy from the gas expander, articulation of a gas expander load, whereby electricity is generated; or alternatively a compressor is powered. A Step 238 includes carrying at least a portion of the re-heated gas from the gas expander to the compressor for further compression and heating of the gas, through a gas expander exhaust conduit.

A final Step 240 comprises adding additional heat to the heated condensate in the solar energy collecting device for storing the heated condensate in a liquid thermal storage, or directly introducing the vaporized condensate into the primary vapor expander. From this point, the closed loop cycle continues as discussed above to continue operating the air-to-air heat exchanger, or cooling unit.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A solar powered closed loop method for powering a cooling unit, the method comprising:
   positioning a solar energy collecting device for optimal harnessing of solar energy;
   heating a liquid which is subsequently used to generate a vapor with the solar energy collecting device;
   carrying the vapor through a solar collector conduit to a primary vapor expander;
   recovering, by the primary vapor expander, the expansion work of the vapor, whereby energy and exhaust is generated;
   urging, with the generated energy from the primary vapor expander, articulation of a primary load, whereby electricity is generated;
   carrying the exhaust through a vapor expander exhaust conduit to a vapor condenser, whereby the vapor condenser causes the exhaust to form a condensate;
   powering a compressor with the energy generated by the primary vapor expander;

compressing a gas with the compressor, whereby the
compression of the gas raises the temperature of the
gas;

carrying the compressed and heated gas through a heated
gas transfer conduit to a gas-liquid heat exchanger,
whereby the compressed and the heated gas releases
heat and consequently cools to a cooled gas while
passing through the gas-liquid heat exchanger;

heating the condensate from the vapor condenser with the
released heat from the heated compressed air passing
through the heat exchanger;

carrying the heated condensate to the solar energy collecting device through a heated condensate return conduit, whereby the condensate is recycled to the vapor state;

carrying a first portion of the cooled gas that has passed through the heat exchanger through a cooled gas transfer conduit to a receiver accumulator, whereby the gas is stored;

carrying at least a portion of the cooled gas to an air-to-air heat exchanger through the cooled gas transfer conduit;

introducing ambient air into the air-to-air heat exchanger through an ambient air inlet, whereby the ambient air is warmer than the cooled air in the air-to-air heat exchanger, whereby heat from the ambient air transfers to the cooled air and the cooled air expands;

egressing, by the cooled ambient air, through a cooled air outlet in the air-to-air heat exchanger;

carrying the re-heated gas from the air-to-air heat exchanger to a gas expander, through a re-heated gas conduit;

expanding the re-heated gas in the gas expander to produce energy for driving a gas expander load;

urging, with the generated energy from the gas expander, articulation of a gas expander load, whereby electricity is generated;

carrying at least a portion of the re-heated gas from the gas expander to the compressor for further compression and heating of the gas, through a gas expander exhaust conduit; and heating the condensate for introduction into the solar energy collecting device for introduction into the primary vapor expander.

2. The method of claim 1, wherein the solar energy collecting device includes at least one of the following: a solar panel, a solar thermal collector, a geothermal source of steam or hot water, photovoltaics, solar thermal energy, solar architecture, molten salt power plants and artificial photosynthesis.

3. The method of claim 1, wherein the air-to-air heat exchanger comprises a cooling unit.

4. The method of claim 1, wherein the step of compressing a gas with the compressor, whereby the compression of the gas raises the temperature of the gas, further comprises, whereby the compression of the gas raises the temperature of the gas by a factor directly proportional to the compression ratio of the compressor.

5. The method of claim 1, wherein the primary vapor expander includes at least one of the following: a turbine, a motor, a steam engine, and a thermal energy recovery system.

6. The method of claim 1, wherein the gas expander includes at least one of the following: a motor or a turbine, powered by a gas.

7. The method of claim 1, wherein the primary load includes at least one of the following: an electrical generation system, a pump, and a direct-connected mechanical device.

8. The method of claim 1, wherein the gas expander load includes at least one of the following: an electrical generation system, a pump, and a direct-connected mechanical device.

9. A solar powered closed loop system for powering a cooling unit, the system comprising:

a solar energy collecting device disposed to receive solar energy, the solar energy collecting device generating a vapor, or a heated liquid in a thermodynamic state such as to produce or become a vapor;

a primary vapor expander receiving the vapor through a solar collector conduit, the primary vapor expander generating energy and exhaust;

a primary load receiving the energy from the primary vapor expander, the primary load generating electricity as a result;

a vapor condenser receiving the exhaust from the primary vapor expander through a vapor expander exhaust conduit, the vapor condenser condensing the exhaust to form a condensate;

a compressor compressing a gas with the energy generated by the vapor expander, whereby the compression of the gas raises the temperature of the gas;

a gas-liquid heat exchanger receiving the compressed and heated gas through a heated gas transfer conduit to a heat exchanger, whereby the compressed and heated the gas releases heat and consequently cools to a cooled gas while passing through the gas-liquid heat exchanger;

a receiver accumulator receiving a first portion of the cooled gas that has passed through the gas-liquid heat exchanger through a cooled gas transfer conduit, whereby the gas is stored;

a gas expander receiving re-heated gas through a re-heated gas conduit, the gas expander expanding the re-heated gas to produce energy for driving a gas expander load; and an air-to-air heat exchanger receiving at least a portion of the cooled gas through the cooled gas transfer conduit, the air-to-air heat exchanger comprising an ambient air inlet for introduction of ambient air, whereby the ambient air is warmer than the cooled air in the air-to-air heat exchanger, whereby heat from the ambient air transfers to the cooled expanding air, the air-to-air heat exchanger further comprising a cooled air outlet through which the cooled ambient air egresses the air-to-air heat exchanger.

10. The system of claim 9, wherein the solar energy collecting device includes at least one of the following: a solar panel, a solar thermal collector, a geothermal source of steam or hot water, photovoltaics, solar thermal energy, solar architecture, molten salt power plants and artificial photosynthesis, and a heat exchanger in association with a source of waste heat or combustion gas.

* * * * *